US006271759B1

(12) United States Patent
Weinbach et al.

(10) Patent No.: US 6,271,759 B1
(45) Date of Patent: Aug. 7, 2001

(54) CONTROLLING AND MONITORING AN ELECTRICAL SYSTEM

(75) Inventors: David Weinbach, Racine, WI (US); Henry W. Painchaud, Vernon Hills, IL (US); Veselin Skendzic, Racine, WI (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 09/587,515

(22) Filed: Jun. 5, 2000

Related U.S. Application Data

(60) Provisional application No. 60/202,074, filed on May 5, 2000.

(51) Int. Cl.[7] .................................................. G08B 21/00
(52) U.S. Cl. ...................... 340/635; 340/638; 307/132 E; 361/1; 361/100; 361/101; 700/292; 700/293
(58) Field of Search .................................. 340/635, 638; 307/132 E; 700/292, 293; 361/1, 71, FOR 100, FOR 101, 72

(56) References Cited

U.S. PATENT DOCUMENTS 5,428,553 * 6/1995 Chiba et al. .......................... 700/292

OTHER PUBLICATIONS

Schweitzer Engineering Laboratories, "SEL–351S Protection And Breaker Control Relay—Optimize Distribution Protection with Breaker Control, Monitoring and Fault Locating", pp. 8–10, www.selinc.com.

Cooper Power Systems, "Putting A New Face On Relay Protection", pp. 1–8, Cooper Industries, Inc. 1999; www.cooperpower.com.

* cited by examiner

*Primary Examiner*—Julie Lieu
(74) *Attorney, Agent, or Firm*—Fish & Richardson P.C.

(57) ABSTRACT

A system for controlling and monitoring operation of an electrical system is described. The system includes a fault protection device, for example, a circuit breaker, that is connected to the electrical system to provide fault isolation. The system also includes a protection system that includes an interface and a logic system connected to the electrical system. The logic system is connected to the interface and controlled by a processor to receive input from the electrical system and input from a user through the interface. The logic system operates the fault protection device when the received input from the electrical system indicates a fault event. Additionally, the logic system indicates information relating to operation of the electrical system through the interface. The system further includes one or more dedicated switches connected to the fault protection device and to the interface to directly present to the operator the breaker status indications and to directly operate the fault protection device in response to input received from the user through the interface in the event that the logic system experiences a failure.

23 Claims, 4 Drawing Sheets

CONTROLLING AND MONITORING AN ELECTRICAL SYSTEM

CROSS-REFERENCE TO RELATED APPLICATIONS

This application claims the benefit of a prior U.S. provisional application Ser. No. 60/202,074 filed May 5, 2000, and entitled "Controlling and Monitoring An Electrical System", the entire disclosure of which is incorporated herein by reference.

TECHNICAL FIELD

This invention relates to protection and circuit breaker control relays.

BACKGROUND

Relays are electrical devices designed to respond to input conditions in a prescribed manner and, after specified conditions are met, to cause contact operation or similar abrupt changes in associated electric control circuits. Input conditions may be electrical, mechanical, thermal, or other quantities or combination of quantities. Electrical inputs include current, voltage, or a combination of current and voltage.

The Institute of Electrical and Electronic Engineers (IEEE) defines a protective relay as a relay whose function is to detect defective lines or apparatus or other electrical system conditions of an abnormal or dangerous nature and to initiate appropriate control circuit action. A protective relay operates when an electrical fault—an abnormal, intolerable situation—occurs on electrical transmission or distribution utility lines. A fault is caused by inadvertent, accidental connections between phase wires or from one or more phase wires to ground.

Some natural events that can cause faults include, by way of example, lightning strikes, wind, ice, earthquake, falling trees, or physical contact by animals. Some accidental events that can cause faults include, by way of example, vehicles hitting poles or contacting live equipment, people contacting live equipment, or work crews digging into underground cables. Many faults in an electrical utility system that uses overhead networked lines are one-phase-to-ground faults resulting primarily from lightning-induced transient high voltage and from falling trees and tree limbs.

Faults in an electrical system may provide significant changes in quantities that describe the electrical system. These changes may be used to indicate the presence of the fault and to distinguish between tolerable and intolerable electrical system conditions. Changing quantities include current, voltage or power, power factor or phase angle, power or current direction, impedance, frequency, temperature, physical movements, pressure, and contamination of insulating quantities.

Protective relays are used to sense or determine trouble in an electrical system. Distribution switches or fault protection devices such as circuit breakers and reclosers are used to open and/or isolate problem areas for fault isolation based on the trouble sensed by the protective relay or by their respective controller. Moreover, protective relays may be applied to all parts of an electrical system, including generators, buses, transformers, transmission lines, distribution lines and feeders, motors, capacitor banks, reactors, etc. Typically, protective relays are separate devices that are connected to the electrical system through current and voltage transformers from high system voltages (for example, around several hundred kiloVolts) down to service levels (for example, around several hundred Volts).

SUMMARY

In one general aspect, a system for controlling and monitoring operation of an electrical system is described. The system includes a fault protection device, for example, a circuit breaker, that is connected to the electrical system to provide fault isolation. The system also includes a protection system that includes an interface and a logic system connected to the electrical system. Moreover, the logic system is controlled by a processor to receive input from the electrical system and input from a user through the interface. The logic system operates the fault protection device when the received input from the electrical system indicates a fault event. Additionally, the logic system indicates information relating to operation of the electrical system through the interface. The system further includes one or more dedicated switches connected to the fault protection device and to the interface to operate the fault protection device in response to input received from the user through the interface.

Embodiments may include one or more of the following features. For example, the protection system may include one or more indicators connected directly to the fault protection device and to the interface to indicate information about the fault protection device. The interface may include a first interface area and a second interface area. The logic system may be connected to the first interface area to receive input from the user through the first interface area and to indicate information to the logic system through the first interface area. One or more dedicated switches may be connected to receive user input through the second interface area.

The protection system may operate the fault protection device in response to user-received input when the logic system fails to operate.

The fault protection device may include a circuit breaker. Likewise, the fault protection device may include a recloser.

The interface may include one or more pushbuttons. Each pushbutton may be coupled to a dedicated switch. Each pushbutton may include an indicator. Each indicator may be a light. The interface may receive input from the user through the one or more pushbuttons and may indicate information relating to operation of the electrical system through the one or more pushbutton indicators.

The interface may include a hot line tag control switch that, when actuated, blocks all commands that would otherwise close the fault protection device. The hot line tag control switch may be implemented in a first microprocessor-controlled interface or it may be implemented in a second hardwired interface.

In another general aspect, a system for controlling and monitoring operation of an electrical system includes a fault protection device connected to the electrical system to provide fault isolation, and a protection system that includes an interface. The protection system further includes a logic system connected to the electrical system and the interface. The logic system is controlled by a processor to receive input from the electrical system and input from a user through the interface. The logic system operates the fault protection device when the received input from the electrical system indicates a fault event. Moreover, the logic system indicates information relating to operation of the electrical system through the interface. The protection system also includes a dedicated system connected to the interface to directly receive input from the electrical system and indicate information relating to operation of the electrically system through the interface based on the directly received input.

The techniques and systems described here are advantageous when installing and operating a protection relay. For example, auxiliary devices that operated as dedicated switches are not required in the controlling and monitoring system. Thus, additional interconnection wiring is reduced. Moreover, a reduction in testing time and in cost is realized because of the reduction in devices. The techniques and systems permit an increase in reliability of the installation of the controlling and monitoring system because interconnection wiring, testing time, and number of devices are reduced. The enhanced tactile feedback provided by the dedicated switches coupled to the interface in addition to the hard-wired indicators reduces human error and therefore provides greater safety benefits.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
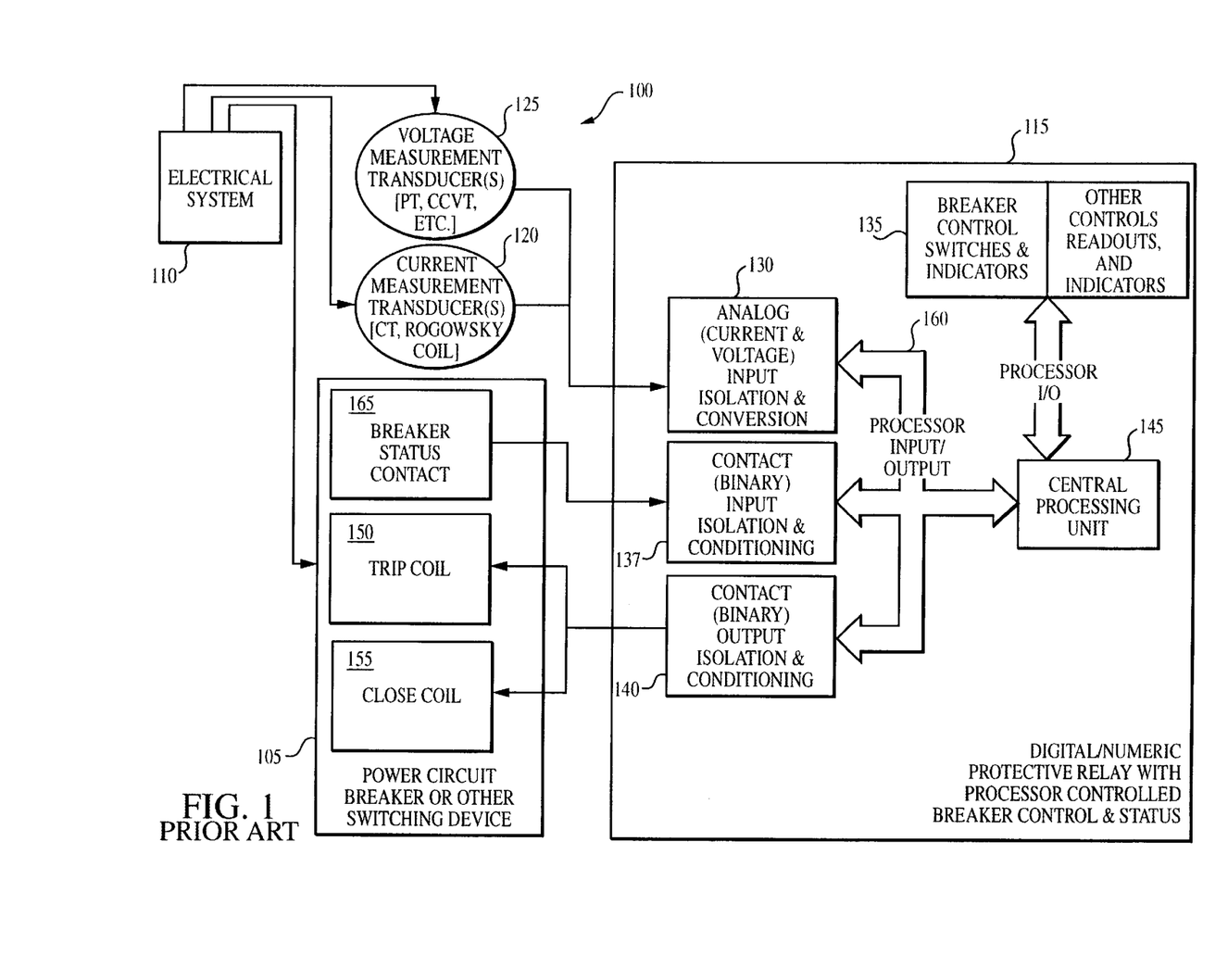
FIG. 1 is a block diagram of a conventional protection system that uses protective relays.

Referring to FIG. 1, a conventional microprocessor-controlled protection relay system 100 includes a circuit breaker 105 that isolates a faulted or damaged area in an electrical system 110 that includes a power supply and transmission line. To provide fault protection, a protective relay 115 is coupled to the transmission line through one or more current transformers 120 associated with the circuit breaker 105 and, if necessary, to one or more voltage transformers 125. These transformers 120, 125 provide, respectively, electrical isolation and low-level secondary signals to the protective relay 115.

The protective relay 115 typically includes an analog input section 130, an interface 135, a contact (binary) input section 137, a contact (binary) output section 140, and a data processing section 145.

The analog input section 130 may perform the following functions. For example, the analog input section 130 may serve to reduce the current and voltage quantities to low voltages and provide first-level filtering. Additionally, the analog input section 130 may serve to receive output from the auxiliary transformers to remove high-frequency noise. The analog input section 130 may operate to sample and hold the analog signals from filters at time intervals determined by a sampling clock to preserve phase information. Furthermore, the analog input section 130 may operate to select one sample-hold signal at a time for subsequent scaling and conversion to digital through an analog-to-digital converter.

The output section 140 couples to a trip coil circuit 150 and a close coil circuit 155 that cause the circuit breaker 105 to, respectively, open or close accordingly.

The data processing section 145 includes a central processing unit (CPU) for controlling internal components of the system and for executing various computations on input data. The data processing section 145 may further include a RAM making up a work area and a data storage area for the CPU, and a ROM for storing a control program and an operation program of the CPU. Additionally, the data processing section couples to an input/output interface 160 that receives and sends signals to and from the analog input section 130, the input section 137, the output section 140, and the interface 135. Thus, the data processing section provides the output section 140 with control signals that are produced as a result of one or more computations. Additionally, the data processing section may receive information about the status (that is, open or close) of the circuit breaker 105 through the input section 137, which receives information directly from a breaker status circuit 165 associated with the circuit breaker 105.

The protection relay system 100 may be implemented in a single-phase electrical system or in a multi-phase system to provide phase-fault protection and/or ground-fault protection.

Figure 2:
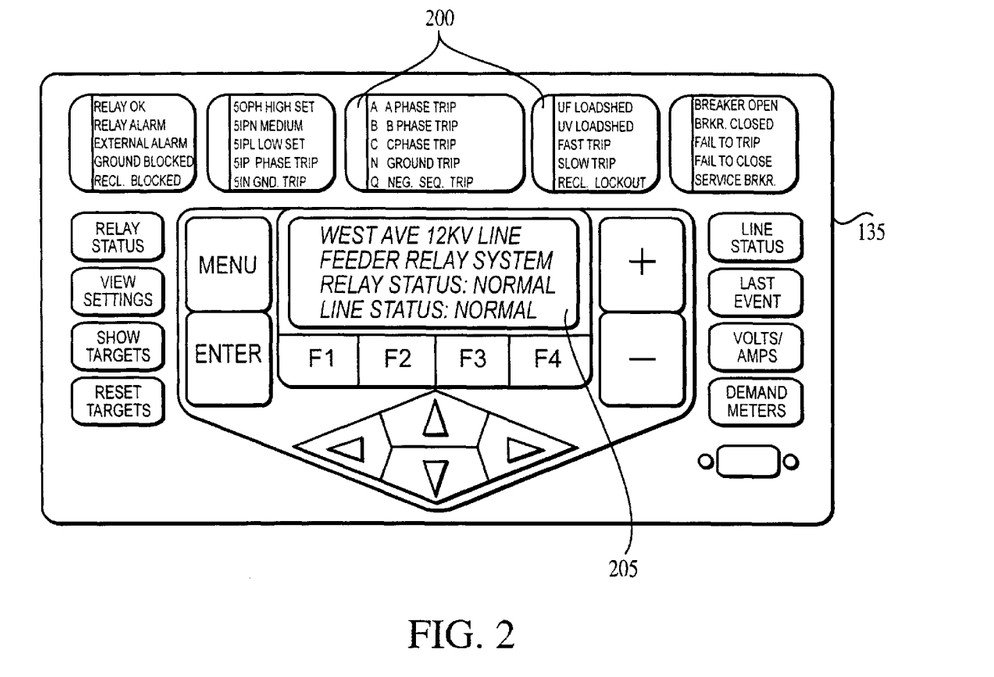
FIG. 2 is an operator interface used in the conventional protection system of FIG. 1.

Referring to FIG. 2, a conventional interface 135 is shown in a rack-type mounting design. The setting interface 135 enables an operator to monitor and control the electrical system 110 when the protective relay 115 is in full service (that is, completely operational). Generally, the interface 135 includes various indicator lights 200 and a display 205 for viewing different quantities relating to operation of the electrical system 110. The interface 135 also may include various pushbutton controls that enable an operator to perform various functional controls to the electrical system 110 to ensure proper operation of the electrical system. Input to the interface 135 is obtained from the operator or from the data processing section 145. Furthermore, all output from the interface 135 is controlled by the data processing section 145. Therefore, if the data processing section 145 fails to operate, the operator is unable to manually monitor and control the electrical system 110 using the interface 135.

Conventionally, the operator could purchase and install at least several different auxiliary devices (for example, dedicated panel switches and annunciators) that could be operated in addition to the interface 135 to provide for emergency monitoring and control of the circuit breaker 105 and/or electrical system 110 in the event that the data processing section 145 fails to operate. Such auxiliary devices require additional set up considerations such as, for example, special interconnection wiring, and additional labor to wire and test the complete site installation.

As discussed above, circuit breaker indicator lights are typically microprocessor-controlled, such that, whenever the CPU fails to operate (such as during a loss of power), the indicator lights would fail to operate. Therefore, indicator lights may be installed as auxiliary devices apart from the microprocessor and apart from the interface 135 in a separate interface. For example, the indicator lights may be connected in series with respective open and close coil circuits of the circuit breaker.

Figure 3:
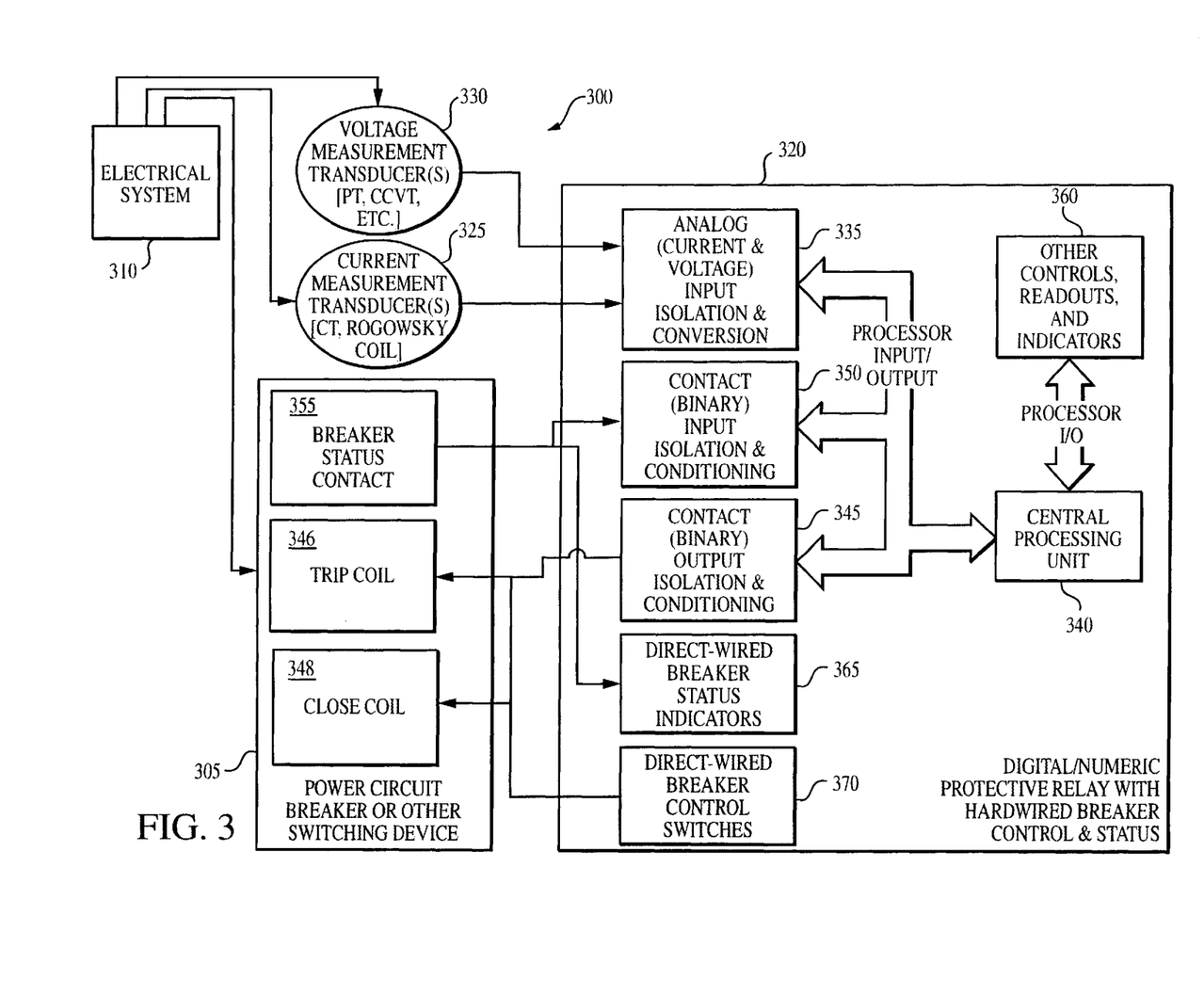
FIG. 3 is a block diagram of a protection system that offers more control and protection.

Referring also to FIG. 3, an improved relay system 300 is shown in which a circuit breaker 305 isolates a faulted or damaged area in an electrical system 310 that includes a power supply and transmission line. To provide fault protection, protective relay 320 is coupled to the transmission line through one or more current transformers 325 and, if necessary, to one or more voltage transformers 330.

As discussed above, the protective relay 320 includes an analog input section 335 for receiving electrical signals from the electrical system 310 and converting the electrical signals to digital signals, a data processing section 340 that includes a microprocessor or CPU, and a contact (binary)

output section 345. The contact (binary) output section 345 drives to a trip coil circuit 346 and a close coil circuit 348 that activate the circuit breaker 305 based on information from the data processing section 340. Also, the protective relay 320 includes a contact (binary) input section 350 that receives information relating to the circuit breaker 305 through a breaker status circuit 355 associated with the circuit breaker 305.

The protective relay 320 further includes various controls, readouts, and/or indicators 360 on a first interface; the controls, readouts, and indicators 360 being controlled by the data processing section 340.

The protective relay 320 also couples directly to the electrical system 310 and/or circuit breaker 305 through a second interface that includes direct-wired breaker status indicators 365 and/or direct-wired breaker control switches 370.

Thus, the first interface, which includes controls, readouts, and indicators 360, receives information relating to the electrical system 310 from the data processing section 340. Likewise, all information output from the controls, readouts, and indicators 360 of the first interface are directed through the data processing section 340. Therefore, operation of the controls, readout, and indicators 360 of the first interface depends on the operation of the data processing section 340.

In contrast, the second interface receives information relating to the electrical system 310 directly from the circuit breaker 305 and/or the breaker status circuit 355 associated with the circuit breaker 305. All information output from the second interface to the electrical system 310 is directed through the one or more control switches 370 that are directly connected (that is, hardwired) to the circuit breaker 305.

The one or more control switches 370 may be connected to the circuit breaker 305 in a fashion identical to previously designed auxiliary devices. In this way, setup and installation of the second interface and control switches 370 may be simplified. For example, in a traditional design, auxiliary switch devices are placed in circuit breaker trip and close coil circuits 346, 348. Therefore, control switches 370 may be coupled to the circuit breaker trip and close coil circuits 346, 348, respectively.

Figure 4:
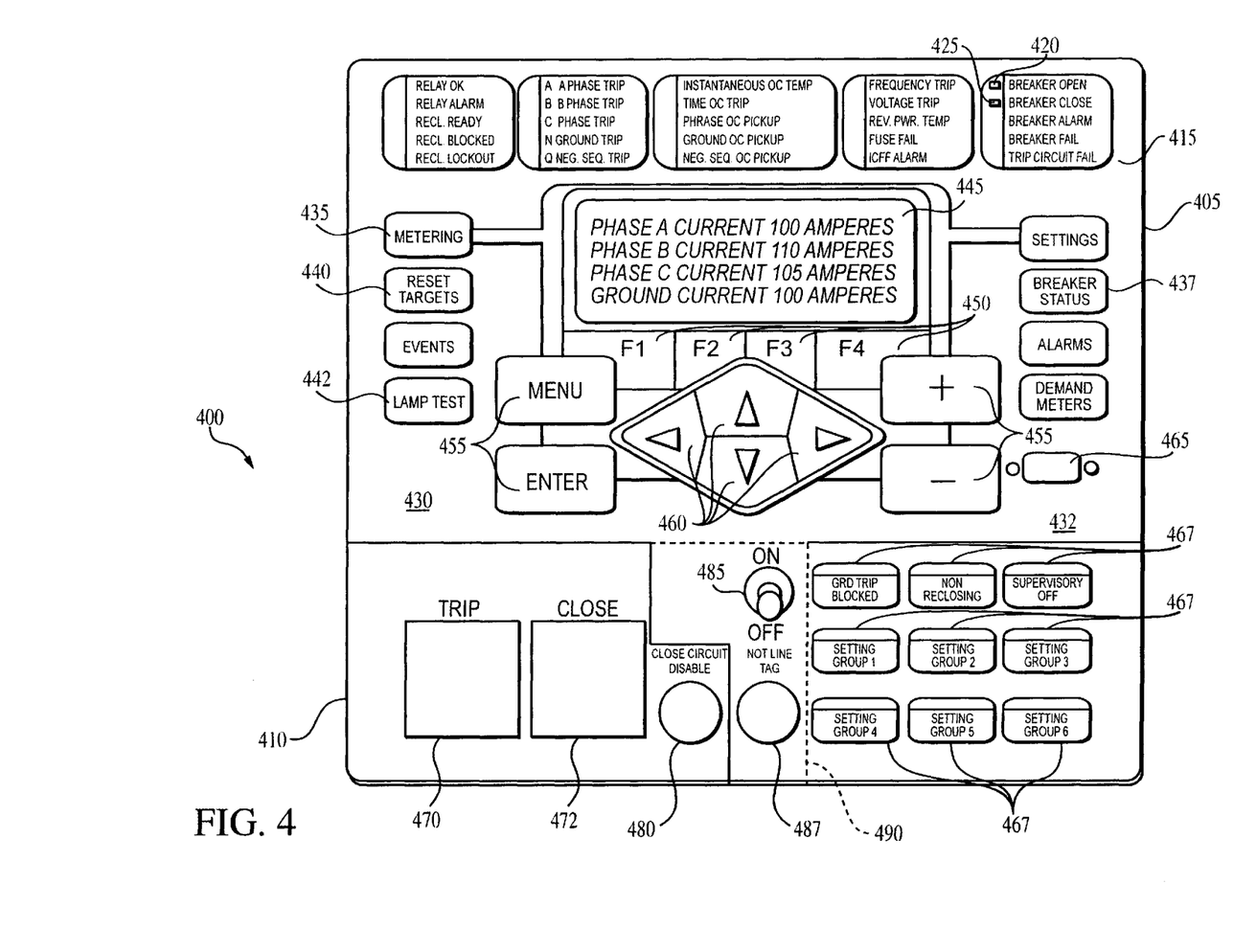
FIG. 4 is an improved operator interface used in the protection system of FIG. 3.

Referring also to FIG. 4, an interface panel 400 is used with the protective relay 320. The panel 400 includes the first interface 405 and the second interface 410. The first interface includes 25 light indicators arranged across a top 415 of the first interface 405. The light indicators provide the operator with information about the electrical system 310. For example, an indicator 420 that is illuminated indicates that the circuit breaker 305 is open, whereas an indicator 425 that is illuminated indicates that the circuit breaker 305 is closed.

The first interface 405 includes eight programmable push buttons arranged in two vertical groups along outer edges 430, 432 of the first interface 405. The programmable push buttons may provide access to functions such as metering 435, breaker status 437, reset targets 440, and lamp test 442.

The first interface 405 further includes a display 445 such as, for example, a liquid crystal display (LCD). The display 445 provides feedback about the electrical system 310 to the operator. For example, the display 445 may indicate one or more phase currents and/or a ground current. Information on the display 445 is controlled using context sensitive function keys F1 through F4 450 located directly below the display 445, navigation buttons 455 located below the function keys 450, and cursor movement buttons 460 located below the function keys 450.

One or more communication ports 465 may be accessed to connect the protective relay 320 through the first interface 405 with another component such as a personal computer or control system.

The first interface 405 also includes nine programmable feature push buttons 467 with integral indicating lights. These push buttons 467 may provide instant access to ground trip block, reclose block, supervisory block, and one touch access to six of the protective relay's eight setting groups or other functions the user may designate. For example, as mentioned above, the operator may disable supervisory control by pushing the supervisory off button.

The second interface 410 includes a trip button 470 and a close button 472 connected to the installed control switches 370 to, respectively, open and close the circuit breaker 305. When the operator pushes the trip button 470, the respective control switch 370 opens the circuit breaker 305 and when the operator pushes the close button 472, the respective control switch 370 closes the circuit breaker 305 if various other conditions are met. For example, a close circuit disable link may be removed (discussed below) to prevent a closing of the circuit breaker 305. Or, a hot line tag function (discussed below) may prevent a closing of the circuit breaker 305. Thus, the operator can manually control the circuit breaker 305 when the protective relay 320 fails to operate, such as, for example, when the power source fails or when internal components in the protective relay 320 fail.

The trip and close buttons 470, 472 may be illuminated by underlying lights that serve as the direct-wired breaker status indicators 365 to indicate the open or close status of the circuit breaker 305 as driven by the breaker status contacts 355. When the operator pushes the trip button 470, the underlying light illuminates to indicate that the circuit breaker 305 is open. Likewise, when the operator pushes the close button 472, the underlying light illuminates to indicate that the circuit breaker 305 is closed. Thus, when the operator pushes an un-illuminated button, the circuit breaker 305 changes its state. A successful change of state is indicated by the loss of illumination of the previously illuminated button, and the illumination of the recently pressed button.

The underlying lights may be hardwired to the circuit breaker 305 through the breaker status circuit 355 to provide status indication even when the protective relay 320 fails to operate, such as, for example, during a loss of power from the power source.

A red light may be used to indicate a closed circuit breaker (power line is energized) and a green light may be used to indicate an open circuit breaker (power line is de-energized).

The circuit configuration that includes the underlying lights may be designed to support traditional wiring configurations used when installing auxiliary indicator lights as discussed above. For example, the underlying lights may be connected in series with the respective open and close operation coil circuit 346, 348 associated with the circuit breaker 305, to provide continuous indication of the status of the circuit breaker 305. Such multi-configuration design provides continuity and consistency to the operations personnel because personnel are able to use the previous wiring configuration during connection of the underlying lights to the circuit breaker.

The second interface 410 may include a close circuit disable link 480 that, when removed, places a physical open in the circuit breaker's circuit, thus making it impossible to close the breaker using the protective relay 320 or the close button 472 under any condition. A hot line tag (HLT) control switch 485 may be implemented in either the first interface 405 or the second interface 410 (as indicated by dashed line 490 in FIG. 4) to interrupt the ability of the protective relay 320 to issue a close command to the circuit breaker 305 by preventing the contact (binary) output 345 and/or pushbutton 472 from issuing a close operation to the circuit breaker 305. In particular, the HLT control switch 485 signals an internal relay to block all circuit breaker close commands.

If the HLT control switch 485 is implemented in the first interface, the HLT control switch 485 may be a center off, spring-loaded toggle switch supervised by the CPU 340. When enabled, the HLT control switch 485 further prevents remote operations through supervisory control, that is, from control switches 370 or communication ports 465. When the HLT control switch 485 is switched on, an HLT light 487 begins flashing on and off if supervisory control is still in operation or the HLT light 487 flashes on continuously if supervisory control is turned off.

If the HLT control switch 485 is in the second interface 410, the HLT control switch 485 may be a two position toggle switch. In this case, operation through the HLT control switch 485 is independent of the CPU 340.

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims. For example, the second interface 410 may include audio devices coupled to the trip and close buttons 470, 472 to indicate the open or close status of the circuit breaker 305. The direct-wired breaker status indicators 365 may be designed at a location on the second interface 410 apart from the trip and close buttons 470, 472.

For simplicity, the first and second interfaces 405, 410 have been shown in separated areas. However, the second interface 410 may be within or may include the first interface 405. Thus, there may be no demarcation between the first and second interfaces 405, 410.

What is claimed is:

1. A system for controlling and monitoring operation of an electrical system, the system comprising:
   a fault protection device connected to the electrical system to provide fault isolation; and
   a protection system that comprises:
      an interface;
      a logic system connected to the electrical system and the interface, and controlled by a processor to:
         receive input from the electrical system,
         receive input from a user through the interface,
         operate the fault protection device when the received input from the electrical system indicates a fault event, and
         indicate information relating to operation of the electrical system through the interface; and
      one or more dedicated switches connected to the fault protection device and to the interface to operate the fault protection device independently of the logic system in response to input received from the user through the interface.

2. The system of claim 1, wherein the protection system includes one or more indicators connected directly to the fault protection device and to the interface to indicate information about the fault protection device.

3. The system of claim 1, wherein the interface includes a first interface area and a second interface area.

4. The system of claim 3, wherein the logic system is connected to the first interface area to receive input from the user through the first interface area and to indicate information through the first interface area.

5. The system of claim 4, wherein the first interface area includes a hot line tag control switch that, when actuated, blocks all commands to close the fault protection device.

6. The system of claim 3, wherein the one or more dedicated switches are connected to receive user input through the second interface area.

7. The system of claim 6, wherein the second interface area includes a hot line tag control switch that, when actuated, blocks all commands to close the fault protection device.

8. The system of claim 1, wherein the protection system operates the fault protection device in response to user-received input when the logic system fails to operate.

9. The system of claim 1, wherein the fault protection device includes a circuit breaker.

10. The system of claim 1, wherein the fault protection device includes a recloser.

11. The system of claim 1, wherein the interface includes one or more pushbuttons, each pushbutton coupled to a dedicated switch.

12. The system of claim 11, wherein each pushbutton includes an indicator.

13. The system of claim 12, wherein each indicator is a light.

14. The system of claim 12, wherein the interface receives input from the user through the one or more pushbuttons and indicates information relating to operation of the electrical system through the one or more pushbutton indicators.

15. The system of claim 1, wherein the interface includes a hot line tag control switch that, when actuated, blocks all commands to close the fault protection device.

16. The system of claim 1, wherein the one or more dedicated switches operates the fault protection device independently of the logic system by bypassing the logic system.

17. A system for controlling and monitoring operation of an electrical system, the system comprising:
   a fault protection device connected to the electrical system to provide fault isolation; and
   a protection system that comprises:
      an interface;
      a logic system connected to the electrical system and the interface, and controlled by a processor to:
         receive input from the electrical system,
         receive input from a user through the interface,
         operate the fault protection device when the received input from the electrical system indicates a fault event, and
         indicate information relating to operation of the electrical system through the interface; and
      a dedicated system connected to the interface and directly to the fault protection device to:
         receive input from the fault protection device independently of the logic system, and
         indicate information relating to operation of the fault protection device through the interface based on the received input.

18. The system of claim 17, wherein the dedicated system receives input from the fault protection device independently of the logic system by bypassing the logic system.

19. A method for controlling and monitoring operation of an electrical system with a protection system that includes a logic system controlled by a processor and an interface, the method comprising:

receiving input from the electrical system;

receiving input from a user through the interface;

operating a fault protection device when received input from the electrical system indicates a fault event;

operating the fault protection device in response to input received from the user through the interface independently of operation of the logic system; and indicating information relating to operation of the fault protection device through the interface independently of operation of the logic system.

20. The method of claim 19, wherein operating the fault protection device in response to input received from the user through the interface independently of operation of the logic system comprises bypassing the logic system.

21. The method of claim 19, wherein indicating information relating to operation of the fault protection device through the interface independently of operation of the logic system comprises bypassing the logic system.

22. The method of claim 19, wherein operating the fault protection device in response to input received from the user through the interface independently of operation of the logic system comprises operating the fault protection device when the logic system fails to operate.

23. The method of claim 19, wherein indicating information relating to operation of the fault protection device trough the interface independently of operation of the logic system comprises indicating the information when the logic system fails to operate.

* * * * *

(12) EX PARTE REEXAMINATION CERTIFICATE (5074th)
United States Patent
Weinbach et al.

(10) Number: US 6,271,759 C1
(45) Certificate Issued: Mar. 1, 2005

(54) CONTROLLING AND MONITORING AN ELECTRICAL SYSTEM (75) Inventors: David Weinbach, Racine, WI (US); Henry W. Painchaud, Vernon Hills, IL (US); Veselin Skendzic, Racine, WI (US)

(73) Assignee: McGraw-Edison Company, Houston, TX (US)

Reexamination Request:
No. 90/006,466, Nov. 27, 2002

Reexamination Certificate for:
Patent No.: 6,271,759
Issued: Aug. 7, 2001
Appl. No.: 09/587,515
Filed: Jun. 5, 2000

Related U.S. Application Data (60) Provisional application No. 60/202,074, filed on May 5, 2000.

(51) Int. Cl.$^7$ .................................................. G08B 21/00
(52) U.S. Cl. ................... 340/635; 340/638; 307/132 E; 361/1; 361/100; 361/101; 700/292; 700/293
(58) Field of Search ........................................... 340/635

(56) References Cited

PUBLICATIONS

Merlin Gerin; *HTA distribution, protection diagnosis monitoring, Sepam Range*; Groupe Schneider; 1994.
Merlin Gerin; *Protection diagnosis monitoring; Sepam 100 MI mimic diagram and local control*; Groupe Schneider; 1996.

NARI–ISA; *ISA, Automation of Electrical Power Systems*; 1996 (with translation).

NARI–ISA; *ISA–1 feeder protective relay (L–2A), Instruction manual*, V2.01; Feb., 1997 (with translation).

Cutler–Hammer; *Magnum DS Low Voltage Power Circuit Breakers and Metal–Enclosed Switchgear*; May, 1998.

*Primary Examiner*—John Tweel (57) ABSTRACT

A system for controlling and monitoring operation of an electrical system is described. The system includes a fault protection device, for example, a circuit breaker, that is connected to the electrical system to provide fault isolation. The system also includes a protection system that includes an interface and a logic system connected to the electrical system. The logic system is connected to the interface and controlled by a processor to receive input from the electrical system and input from a user through the interface. The logic system operates the fault protection device when the received input from the electrical system indicates a fault event. Additionally, the logic system indicates information relating to operation of the electrical system through the interface. The system further includes one or more dedicated switches connected to the fault protection device and to the interface to directly present to the operator the breaker status indications and to directly operate the fault protection device in response to input received from the user through the interface in the event that the logic system experiences a failure.

US 6,271,759 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 11, 14, 15, 17 and 19–23 are determined to be patentable as amended.

Claims 4–10, 12–13, 16 and 18, dependent on an amended claim, are determined to be patentable.

1. A system for controlling and monitoring operation of an electrical system, the system comprising:
    a fault protection device connected to the electrical system to provide fault isolation; and
    a protection system that comprises:
        an interface *panel*;
        a logic system connected to the electrical system and the interface *panel*, and controlled by a processor to:
            receive input from the electrical system,
            receive input from a user through the interface *panel*,
            operate the fault protection device when the received input from the electrical system indicates a fault event, and
            indicate information relating to operation of the electrical system through the interface *panel*; and
        one or more dedicated switches connected to the fault protection device and to the interface *panel* to operate the fault protection device independently of the logic system in response to input received from the user through the interface *panel*.

2. The system of claim 1, wherein the protection system includes one or more indicators connected directly to the fault protection device and to the interface *panel* to indicate information about the fault protection device.

3. The system of claim 1, wherein the interface *panel* includes a first interface area and a second interface area.

11. The system of claim 1, wherein the interface *panel* includes one or more pushbuttons, each pushbutton coupled to a dedicated switch.

14. The system of claim 12, wherein the interface *panel* receives input from the user through the one or more pushbuttons and indicates information relating to operation of the electrical system through the one or more pushbutton indicators.

15. The system of claim 1, wherein the interface *panel* includes a hot line tag control switch that, when actuated, blocks all commands to close the fault protection device.

17. A system for controlling and monitoring operation of an electrical system, the system comprising:
    a fault protection device connected to the electrical system to provede fault isolation; and
    a protection system that comprises:
        an interface *panel*;
        a logic system connected to the electrical system and the interface *panel*, and controlled by a processor to:
            receive input from the electrical system,
            receive input from a user through the interface *panel*,
            operate the fault protection device when the received input from the electrical system indicates a fault event, and
            indicate information relating to operation of the electrical system through the interface *panel*; and
        a dedicated system connected to the interface *panel* and directly to the fault protection device to:
            receive input from the fault protection device independently of the logic system, and
            indicate information relating to operation of the fault protection device through the interface *panel* based on the received input.

19. A method for controlling and monitoring operation of an electrical system with a protection system that includes a logic system controlled by a processor and an interface *panel*, the method comprising:
    receiving input from the electrical system;
    receiving input from a user through the interface *panel*;
    operating a fault protection device when received input from the electrical system indicates a fault event;
    operating the fault protection device in response to input received from the user through the interface *panel* independently of operation of the logic system; and
    indicating information relating to operation of the fault protection device through the interface *panel* independently of operation of the logic system.

20. The method of claim 19, wherein operating the fault protection device in response to input received from the user through the interface *panel* independently of operation of the logic system comprises bypassing the logic system.

21. The method of claim 19, wherein indicating information relating to operation of the fault protection device through the interface *panel* independently of operation of the logic system comprises bypassing the logic system.

22. The method of claim 19, wherein operating the fault protection device in response to input received from the user through the interface *panel* independently of operation of the logic system comprises operating the fault protection device when the logic system fails to operate.

23. The method of claim 19, wherein indicating information relating to operation of the fault protection device trough the interface *panel* independently of operation of the logic system comprises indicating the information when the logic system fails to operate.

\* \* \* \* \*